United States Patent
Feger et al.

(10) Patent No.: US 6,290,371 B1
(45) Date of Patent: Sep. 18, 2001

(54) LIGHT FOR A VEHICLE

(75) Inventors: Rolf Feger, Bietigheim-Bissingen; Reiner Lendle, Hassmersheim, both of (DE)

(73) Assignee: Valeo Beleuchtung Deutschland GmbH, Bietigheim-Bissingen (DE)

( * ) Notice: Subject to any disclaimer, the term of this patent is extended or adjusted under 35 U.S.C. 154(b) by 0 days.

(21) Appl. No.: 09/487,285

(22) Filed: Jan. 19, 2000

(30) Foreign Application Priority Data

Jan. 23, 1999 (DE) .............................................. 199 02 629

(51) Int. Cl.[7] ...................................................... B60Q 1/02
(52) U.S. Cl. ........................ 362/217; 362/263; 362/539; 362/543; 362/351; 362/519; 362/307
(58) Field of Search ..................................... 362/538, 539, 362/351, 217, 263, 543, 516, 519, 307, 310, 311

(56) References Cited

U.S. PATENT DOCUMENTS

| 5,347,435 | 9/1994 | Smith et al. | |
| 5,782,550 | * 7/1998 | Ohashi et al. | 362/351 |
| 5,879,073 | * 3/1999 | Hori et al. | 362/351 |
| 6,079,860 | * 6/2000 | Ito | 362/351 |
| 6,132,068 | * 10/2000 | Katsumata | 362/351 |

FOREIGN PATENT DOCUMENTS

| 6 15 690 | 6/1935 | (DE) . |
| 9 30 612 | 6/1955 | (DE) . |
| 94 13 286 | 12/1994 | (DE) . |
| 44 17 695 | 11/1995 | (DE) . |
| 197 37 550 | 3/1998 | (DE) . |
| 08238981 | 9/1996 | (JP) . |
| 08244524 | 9/1996 | (JP) . |
| WO 98 12 471 | 3/1998 | (WO) . |

* cited by examiner

*Primary Examiner*—Thomas M. Sember
(74) *Attorney, Agent, or Firm*—Paul Vincent

(57) ABSTRACT

The invention concerns a light having a reflector, at least one neon lamp, and a cover plate, wherein the light is provided with a shield for shielding the direct light of the neon lamp travelling towards the cover plate.

16 Claims, 5 Drawing Sheets

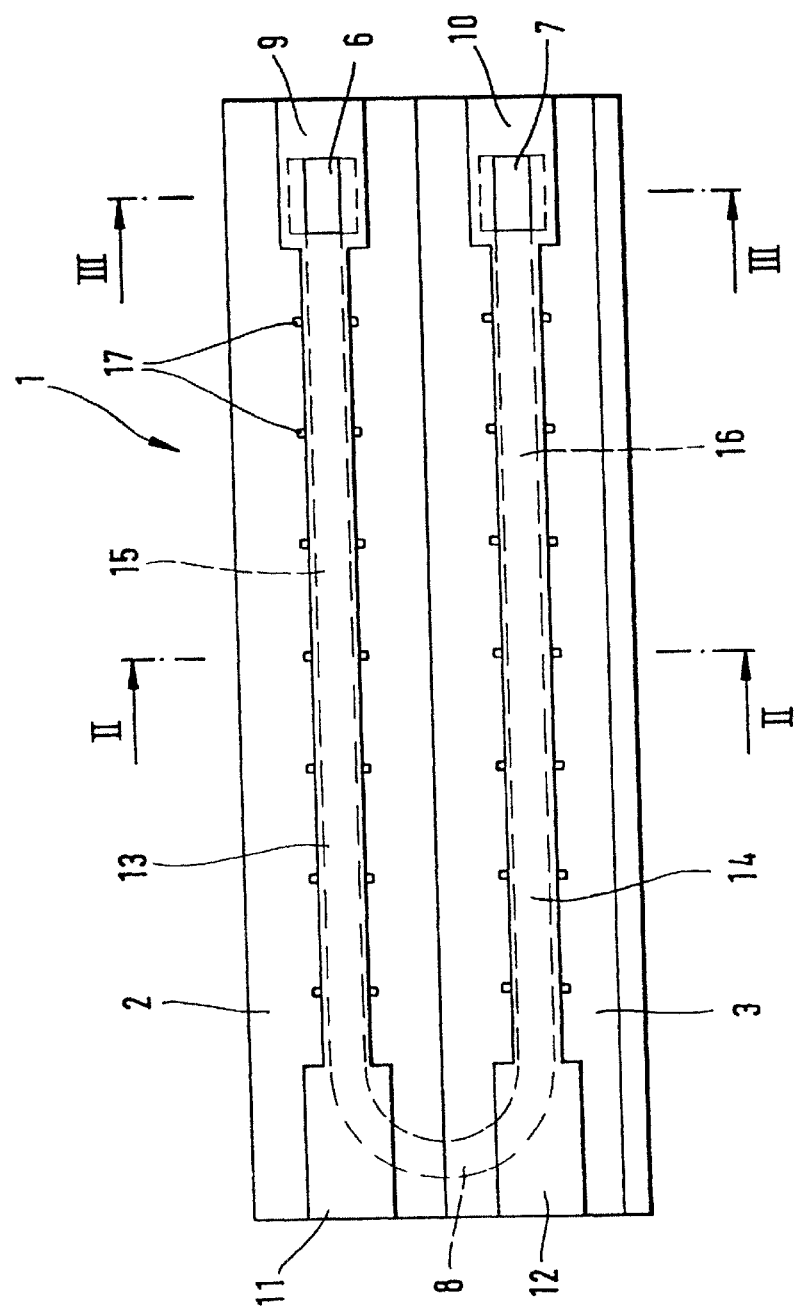

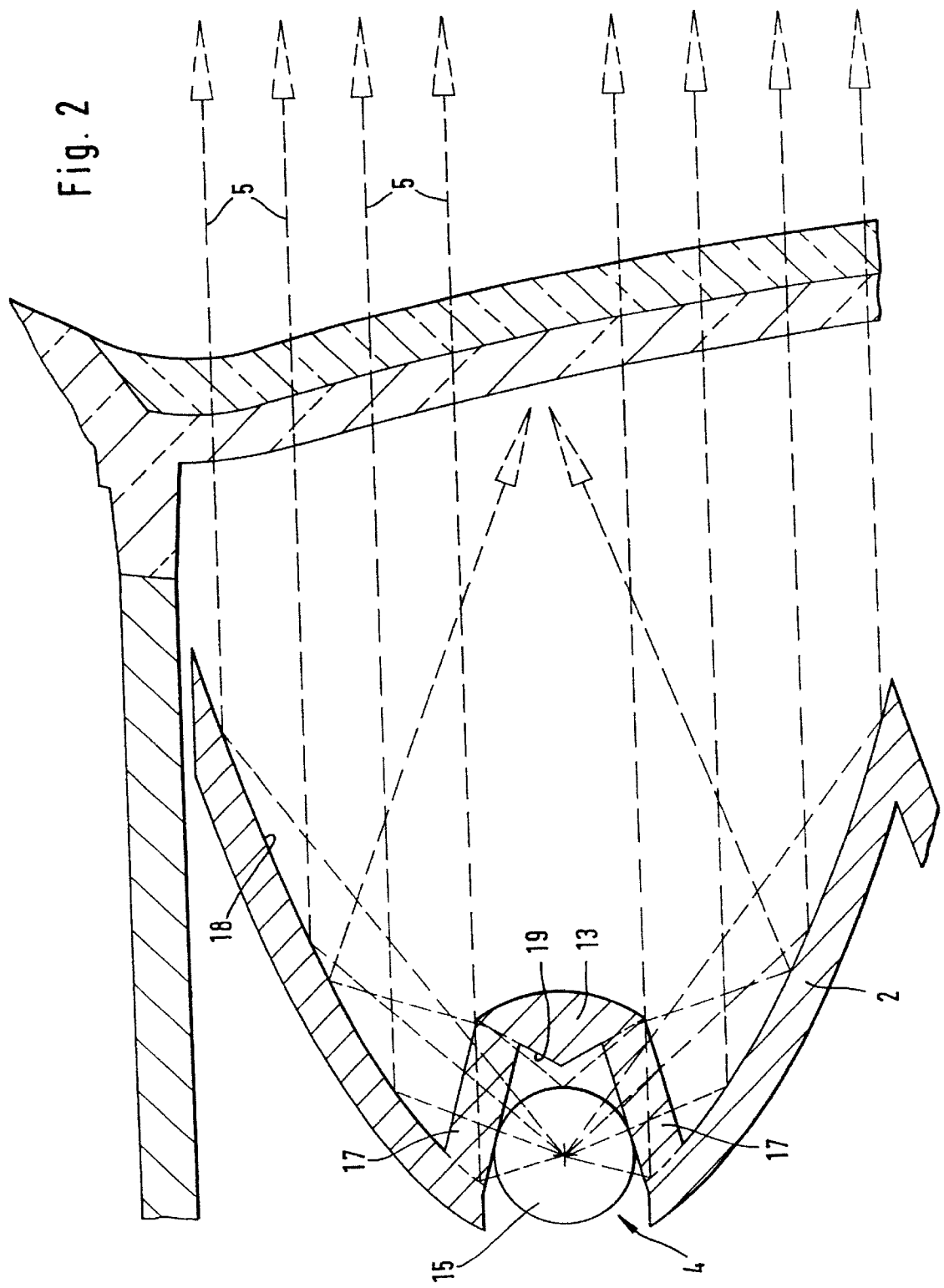

LIGHT FOR A VEHICLE

This application claims Paris Convention priority from DE 199 02 629.7 filed Jan. 23, 1999 the complete disclosure of which is hereby incorporated by reference.

BACKGROUND OF THE INVENTION

The invention concerns a light for a vehicle having a reflector, at least one neon lamp and a cover plate.

DE 94 13 286 U1 describes an auxiliary brake light for an automobile which is disposed on the inside rear shelf of the vehicle and is directed towards the rear window. A curved fluorescent tube can be disposed within the lighting housing. Although fluorescent tubes can effect a very high light yield, the neon lamp is visible as a bright stripe and the light intensity decreases rapidly with distance. In addition, the connector elements must be covered with additional components. Another disadvantage is that, for insertion or exchange of the fluorescent tubes, either the cover plate has to be removed or the entire lamp must be dismounted.

WO-A-98 12 471 describes a rear light in which a plurality of fluorescent tubes are disposed in front of the reflector.

SUMMARY OF THE INVENTION

Departing from DE 94 13 286 U1 it is the underlying purpose of the invention to provide a light in which a neon lamp can be easily inserted and with which the neon lamp can be exchanged in a simple fashion.

This purpose is achieved in accordance with the invention with a light of the above mentioned kind in that the reflector is provided with a shield for the direct light travelling towards the cover plate.

This shield prevents the neon lamp from being visible through the cover plate as a bright stripe. In addition, this shield prevents the neon lamp from blinding other drivers and passengers due to its high light intensity and associated light density. The illumination and the overall lighting effect is thereby improved. Possible lights include rear lights, brake lights, blinkers, backup lights etc.

A preferred improvement provides that the neon lamp can be inserted into the reflector from the backside thereof. The reflector has an opening having a shape adapted to that of the neon light through which the neon light can be completely or partially inserted into the reflector from the rear, i.e. from the backside. This has the substantial advantage that the cover plate must not be detached from the reflector in order to insert or exchange the neon lamp and the cover plate can even be permanently mounted to the reflector. An additional advantage of the light in accordance with the invention, is that the neon lamp can be easily attached to the reflector from inside the vehicle and even optionally without the use of tools. In another embodiment, the neon lamp can be inserted from the front.

A further improvement provides that the shield is configured to reflect light at the side facing the neon lamp, in particular, to deflect the light towards the reflector. The light directly incident from the neon lamp onto the shield is deflected by the shield, in particular by its reflector, towards the main reflector of the lamp so that this light can be utilized and is not destroyed behind the cover.

In accordance with the invention, the shield is connected to the reflector via one or a plurality of braces. The braces have the advantage that the large length of the neon lamp is associated with nearly no shadowing.

The shield is advantageously formed on the reflector and is preferentially integral therewith. In this fashion, the shield and the reflector can be simultaneously evaporation coated and must not be subsequently processed further. The integral configuration has the additional advantage that the shield is exactly positioned in or on the reflector.

In an embodiment of the invention, the shield is partially permeable to light so that a black stripe is not produced in the cover. The partial optical permeability of the shield can thereby be selected in such a fashion that the intensity of the light passing through the shield is as large as the intensity of the light reflected from the reflector.

An improvement provides that the shield has a surface structure on the side facing away from the neon lamp and/or is tinted. This facilitates optical or design effects.

In an additional embodiment, the reflector has a corrugated or stepped reflector surface. Instead of a parabolic shape, the corrugated reflector can reflect the light towards the cover plate in dependence on the configuration of the corrugations. This can also be achieved using a stepped reflector surface.

The back side of the reflector preferentially has holding elements and or plug contacts for the neon lamp. The plug contacts for the neon lamp are thereby covered so that no additional covering is necessary. The holding elements can be used to precisely position and mount the tubes of the neon lamp. The tubes can e.g. directly seat on the holding elements.

Further advantages, details and features of the invention can be extracted from the dependent claims as well as from the following description in which particularly preferred embodiments are described in detail with reference to the drawing. The features disclosed in the description and the claims and shown in the drawing can be important to the invention individually or collectively in arbitrary combination.

BRIEF DESCRIPTION OF THE DRAWING

FIG. 1 shows a plan view of a reflector having a schematically indicated neon lamp;

FIG. 2 shows a cut through the reflector II—II in accordance with FIG. 1;

FIG. 3 shows a cut III—III through the reflector in accordance with FIG. 1, showing plug contacts;

DESCRIPTION OF THE PREFERRED EMBODIMENT

Figure 4:
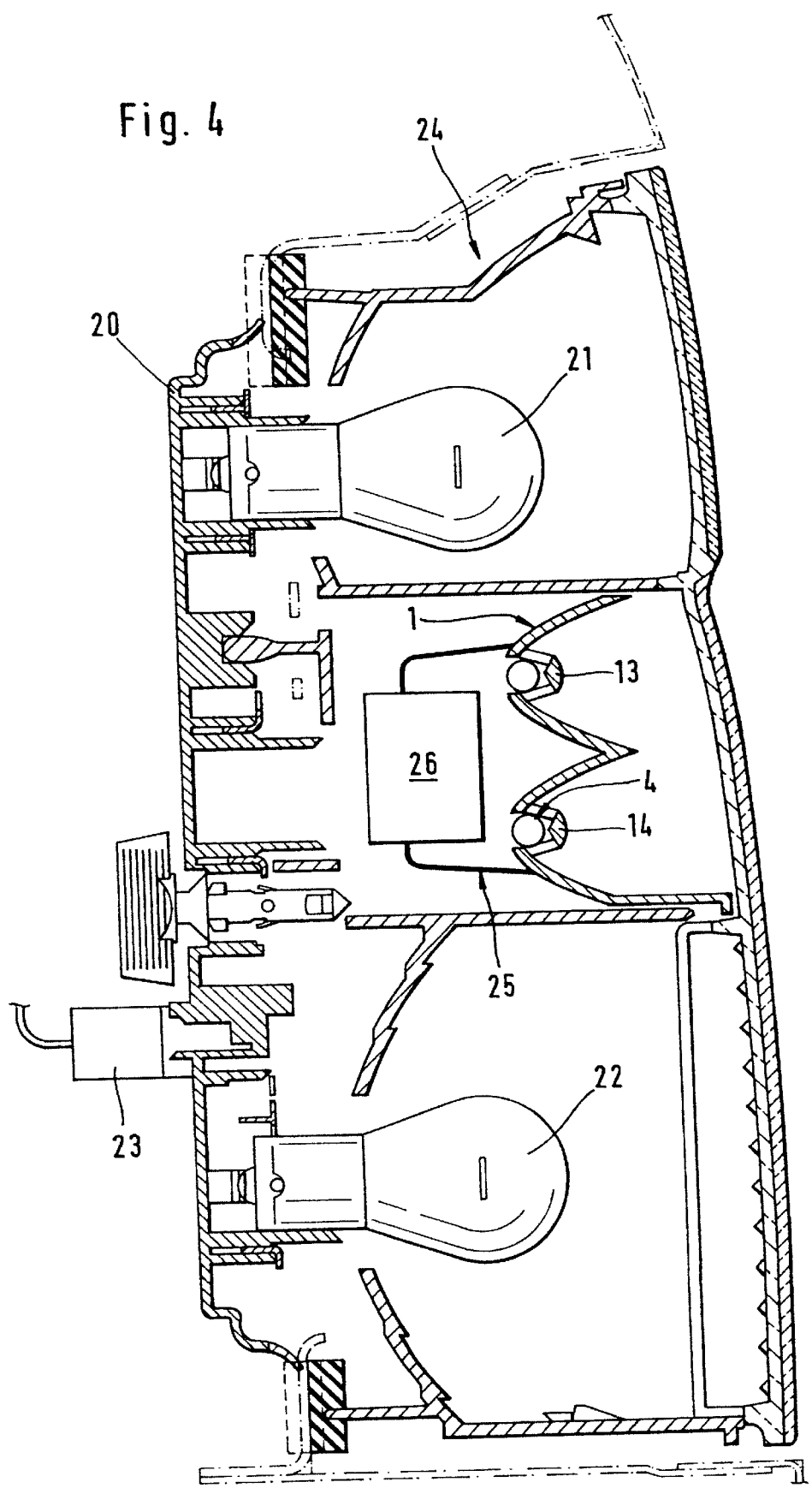
FIG. 4 shows a cross section through a first embodiment of a rear light.

The embodiment FIG. 1 shows a reflector, indicated in its entirety with 1, comprising two reflector shells 2 and 3. The reflector shell 2 is shown in an enlarged representation in FIG. 2. As can be seen in FIG. 2, both reflector shells 2 and 3 are curved with a parabolic shape so that the light from a neon lamp 4 is deflected into substantially parallel beams 5 (FIG. 2). The neon lamp 4 has two connector elements 6 and 7 and comprises a curved section 8. The reflector 1 comprises covers 9 through 12 proximate the connector elements 6 and 7 as well as in the region of the curved section 8 which cover the connector elements 6 and 7 and the curved section 8.

A shield 13 and 14 extends between each of the covers 9 and 11 as well as 10 and 12. Linear sections 15 and 16 of the neon lamp 4 are covered by the shields 13 and 14 in a direction of a cover plate (not shown). This prevents the neon lamp 4 light from being directly incident on the cover plate. In addition, the neon lamp 4 cannot be seen from the outside, i.e. through the cover plate. The shields 13 and 14 are connected to the reflector shells 2 via narrow braces 17. The width of the braces 17 is selected in such a fashion that only negligible regions of the linear section 15 and 16 of the neon lamp 4 are covered. The braces 17 also firmly connect the shields 13 and 14 are to the reflector shells 2 and 3 so that they can be handled together therewith.

Output openings are located between the shield 13 and the reflector shell 2 as well as between pairs of braces 17 through which the light from the neon lamp 4 can escape to be incident on the reflector surface 18 where it is deflected into substantially parallel beams 4. The light incident on the side of the shield 13 facing the neon lamp 4 is deflected by a second reflector 19 so that this light likewise passes through the openings and can be used. Towards this end, this reflector 19 has a light deflecting geometry.

As can also be seen in FIG. 2, the braces 17 seat on the surface of the neon lamp 4 to thereby hold the neon lamp 4 in a defined position.

FIG. 3 shows the two reflector shells 2 and 3 in a sectional representation. The two covers 9 and 11 cover the two connector elements 6 and 7 of the neon lamp 4.

FIG. 4 shows a section of a first embodiment of the invention in accordance with FIGS. 2 and 3. One can clearly see that the rear side of the reflector 1 is accessible after removal of a cover shell 20 from the rear light 24. Light bulbs 21 and 22 as well as elements 23 for power supply are disposed on the cover shell 20. The back side is covered by a cap having an integral fluorescent lamp ballast 26. After the cap 25 is removed, the neon lamp 4 is freely accessible and can be inserted into and removed from the back side of the reflector 1. Exchange of the neon lamp 1 is thereby simple and straight forward.

Figure 5:
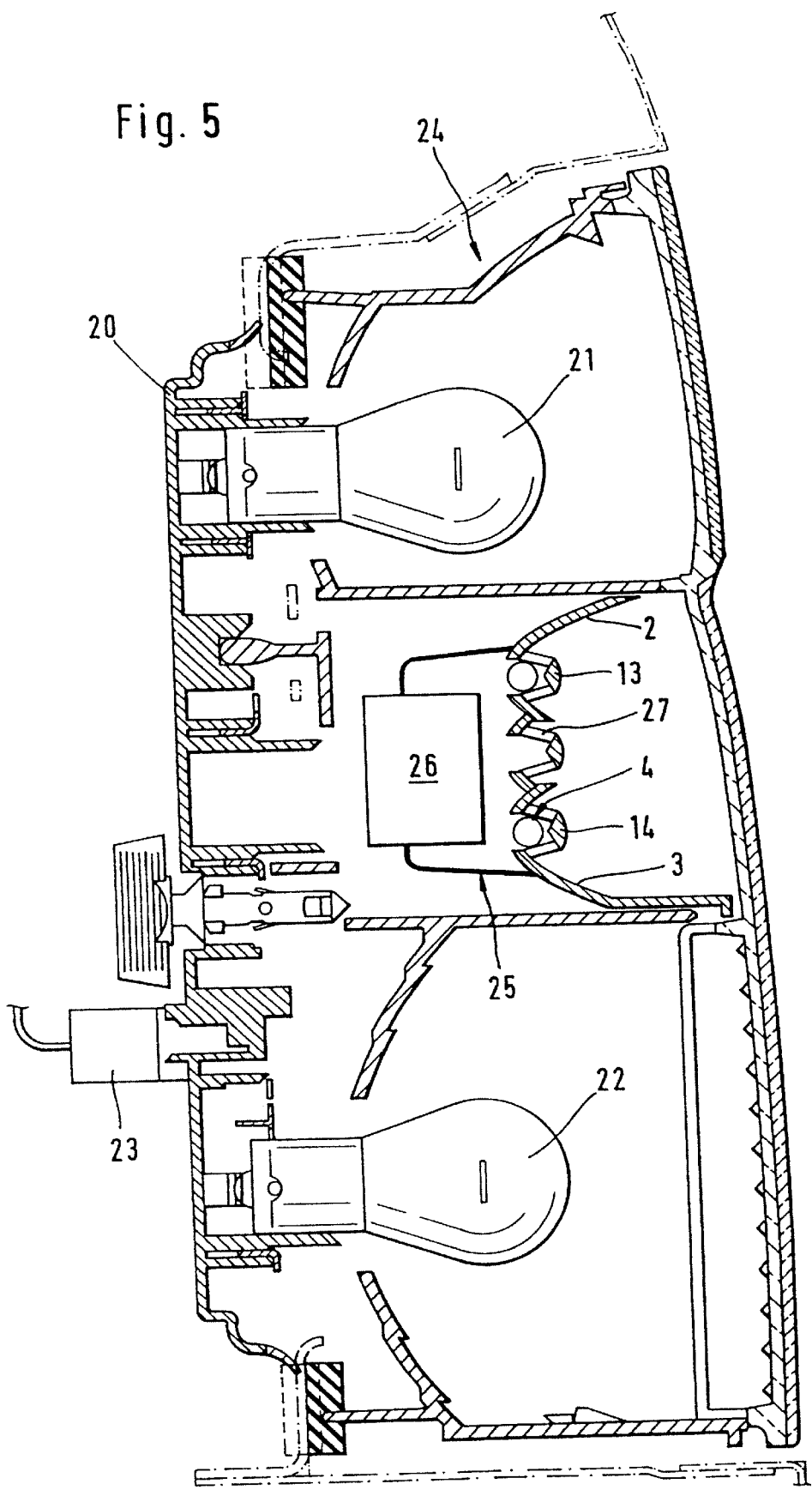
FIG. 5 shows a cross section through a second embodiment of a rear light.
Figure 6:
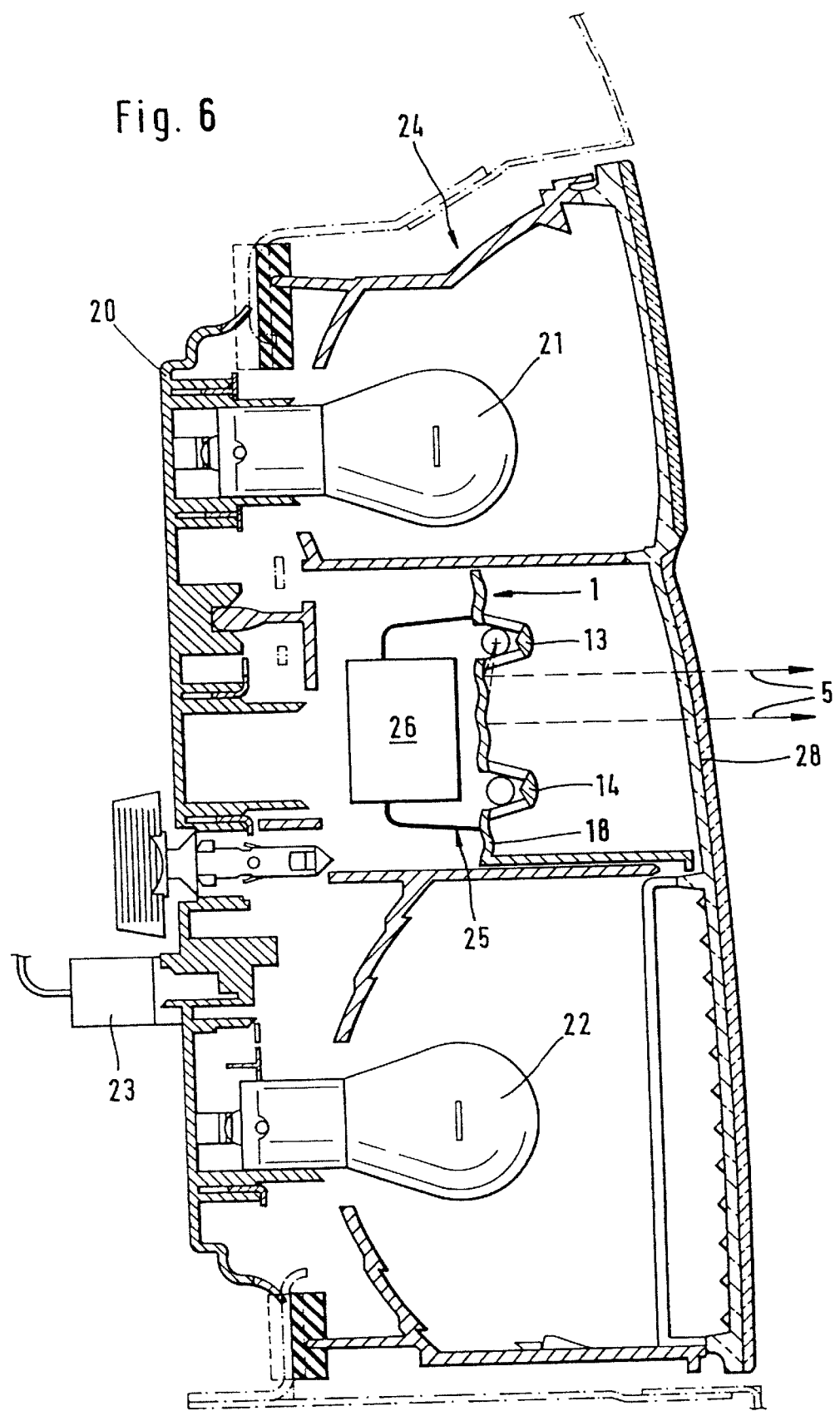
FIG. 6 shows a cross section through a third embodiment of a rear light.

FIG. 5 shows a second embodiment with an additional recepticle 27, provided between the two reflector shells 2 and 3, for a linear section of a neon lamp 4. FIG. 6 finally shows a third embodiment with which the reflector 1 has a corrugated reflector surface 18, wherein the corrugated contours are configured in such a fashion that they deflect the light incident thereon towards the cover plate 28 in substantially parallel beams 5. This allows individual design goals to be taken into consideration.

In any event and in all embodiments, the neon lamp 4 is covered by shields 13 and 14 so that the radiation from the neon lamp 4 is not directly incident on the cover plate 28.

We claim:

1. A light comprising:

a housing;

a cover plate mounted to said housing;

at least one neon lamp mounted within said housing, said neon lamp having an elongated illuminating section;

a reflector mounted within said housing proximate said neon lamp, said reflector having an elongated reflector section extending substantially parallel to said elongated illuminating section; and a shield mounted within said housing between said neon lamp and said cover plate for shielding direct light from said elongated illuminating section travelling towards said cover plate, wherein said elongated illuminating section and said elongated reflection section are aligned and dimensioned to direct light emitted from said elongated illuminating section and incident on said reflector, toward said cover plate.

2. The light of claim 1, wherein said reflector for insertion of said neon lamp from one of a back and a front of said reflector.

3. The light of claim 2, wherein said shield comprises means for reflecting light at a side facing said neon lamp.

4. The light of claim 3, wherein said reflecting means direct light towards said reflector.

5. The light of claim 2, further comprising at least one brace for connecting said shield to said reflector.

6. The light of claim 2, wherein said shield is one of fashioned on and integral with said reflector.

7. The light of claim 2, wherein said shield is partially permeable to light.

8. The light of claim 2, wherein said shield has a surface structure on a side facing away from said neon lamp.

9. The light of claim 2, wherein said shield is tinted.

10. The light of claim 2, wherein said shield covers a linear section of said neon lamp.

11. The light of claim 1, wherein said reflector has a corrugated or stepped reflector surface.

12. The light of claim 1, wherein said reflector comprises at least one of holding elements and plug contacts for said neon lamp.

13. The light of claim 12, further comprising means for covering said plug contacts.

14. The light of claim 13, wherein said covering means are integral with said reflector.

15. The light of claim 14, wherein said covering means consist essentially of an embossment on said reflector.

16. The light of claim 12, wherein said holding elements seat on and fix a tube of said neon lamp.

* * * * *